US012779887B2

(12) United States Patent
Maki

(10) Patent No.: US 12,779,887 B2
(45) Date of Patent: Nov. 3, 2026

(54) METHOD OF MANUFACTURING PRINTER

(71) Applicant: SEIKO EPSON CORPORATION, Tokyo (JP)

(72) Inventor: Yoichiro Maki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 18/973,187

(22) Filed: Dec. 9, 2024

(65) Prior Publication Data

US 2026/0116109 A1 Apr. 30, 2026

(30) Foreign Application Priority Data

Dec. 11, 2023 (JP) ................................ 2023-208307

(51) Int. Cl.

| | |
|---|---|
| ***B41J 29/393*** | (2006.01) |
| ***B41J 2/165*** | (2006.01) |
| ***G06K 15/02*** | (2006.01) |
| ***G06T 7/00*** | (2017.01) |
| ***G06T 7/73*** | (2017.01) |

(52) U.S. Cl.

CPC ......... *B41J 29/393* (2013.01); *B41J 2/16517* (2013.01); *B41J 2/16579* (2013.01); *G06K 15/027* (2013.01); *G06T 7/0004* (2013.01); *G06T 7/73* (2017.01); *B41J 2029/3935* (2013.01); *G06K 2215/101* (2013.01); *G06T 2207/30144* (2013.01); *G06T 2207/30204* (2013.01)

(58) Field of Classification Search

CPC .. B41J 29/393; B41J 2/16517; B41J 2/16579; B41J 2029/3935; B41J 2/2142; B41J 2/2146; B41J 2/01; B41J 3/44; G06K 15/027; G06K 2215/101; G06T 7/0004; G06T 7/73; G06T 2207/30144; G06T 2207/30204; G01B 11/00

See application file for complete search history.

(56) References Cited

U.S. PATENT DOCUMENTS 10,889,127 B2 * 1/2021 Yokozawa ............... B41J 29/38
2023/0256730 A1 8/2023 Maki

FOREIGN PATENT DOCUMENTS

JP 2023-119715 A 8/2023

* cited by examiner

*Primary Examiner* — Lisa Solomon
(74) *Attorney, Agent, or Firm* — Spencer Fane LLP

(57) ABSTRACT

A method of manufacturing a printer configured to manufacture an adjusted printer from an unadjusted printer of a serial inkjet type includes making the unadjusted printer print at least two first markers using black ink, and making the unadjusted printer print at least two second markers using chromatic color ink, wherein the second marker has a shape in which the chromatic color ink is applied in a region in which the black ink is not applied in the first marker when a central position of the second marker is aligned with a central position of the first marker, and a position of the inspection pattern in the inspection sheet is identified based on a position of a marker determined by analysis.

7 Claims, 13 Drawing Sheets

FIG. 5

| | B | 1B | 2B | 3B | 4B |
|---|---|---|---|---|---|
| A | | 51 | 49 | 46 | 42 |
| 1A | 3 | 48 | 46 | 43 | 39 |
| 2A | 5 | 46 | 44 | 41 | 37 |
| 3A | 8 | 43 | 41 | 38 | 34 |
| 4A | 12 | 39 | 37 | 34 | 30 |

| | B | 1B | 2B | 3B | 4B |
|---|---|---|---|---|---|
| A | | 51 | 49 | 46 | 42 |
| 1A | 3 | 48 | 46 | 43 | 39 |
| 2A | 5 | 46 | 44 | 41 | 37 |
| 3A | 8 | 43 | 41 | 38 | 34 |
| 4A | 12 | 39 | 37 | 34 | 30 |

FIG. 11A

| | B | 1B | 2B | 3B | 4B |
|---|---|---|---|---|---|
| A | | 52 | 50 | 47 | 43 |
| 1A | 2 | 50 | 48 | 45 | 41 |
| 2A | 4 | 48 | 46 | 43 | 39 |
| 3A | 7 | 45 | 43 | 40 | 36 |
| 4A | 11 | 41 | 39 | 36 | 32 |

FIG. 11B

| | B | 5B | 6B | 7B | 8B |
|---|---|---|---|---|---|
| A | | 53 | 51 | 48 | 44 |
| 5A | 3 | 50 | 48 | 45 | 41 |
| 6A | 5 | 48 | 46 | 43 | 39 |
| 7A | 8 | 45 | 43 | 40 | 36 |
| 8A | 12 | 41 | 39 | 36 | 32 |

FIG. 13A

| | B | 1B | 2B | 3B | 4B |
|---|---|---|---|---|---|
| A | | 52 | 50 | 47 | 43 |
| 1A | 2 | 50 | 48 | 45 | 41 |
| 2A | 4 | 48 | 46 | 43 | 39 |
| 3A | 7 | 45 | 43 | 40 | 36 |
| 4A | 11 | 41 | 39 | 36 | 32 |

FIG. 13B

| | B | 5B | 6B | 7B | 8B |
|---|---|---|---|---|---|
| A | | 53 | 51 | 48 | 44 |
| 5A | 3 | 50 | 48 | 45 | 41 |
| 6A | 5 | 48 | 46 | 43 | 39 |
| 7A | 8 | 45 | 43 | 40 | 36 |
| 8A | 12 | 41 | 39 | 36 | 32 |

METHOD OF MANUFACTURING PRINTER

The present application is based on, and claims priority from JP Application Serial Number 2023-208307, filed Dec. 11, 2023, the disclosure of which is hereby incorporated by reference herein in its entirety.

BACKGROUND

1. Technical Field

The present disclosure relates to a method of manufacturing a printer.

2. Related Art

In the past, there has been known a technology of scanning a print medium on which a specific inspection pattern is printed to thereby detect a print error. JP-A-2023-119715 discloses a technology of correctly identifying a size, a position, and a tilt of an adjustment pattern (inspection pattern).

JP-A-2023-119715 is an example of the related art.

Such an inspection pattern as to correct a print error such as a medium conveyance deviation (PF deviation, Paper Feed deviation) or a misalignment (Bi-D) of a dot formation position caused by a relative positional movement between the print unit and the medium in the main scanning direction during reciprocation is printed on the inspection sheet. Further, it is desired to confirm presence or absence of nozzle clogging in some cases using the inspection pattern. In such cases, the inspection sheet includes the inspection pattern for inspecting the nozzle clogging. In a state where the nozzle clogging is not eliminated, it is not possible to correctly print the inspection pattern for correcting other print errors. Therefore, it is desired to reliably detect the inspection pattern for nozzle clogging.

SUMMARY

In view of the problems described above, the present disclosure is related to a method of manufacturing a printer including making an unadjusted printer of a serial inkjet type print an inspection sheet including an inspection pattern, making a scan unit read the inspection sheet, and adjusting the unadjusted printer based on the inspection pattern which is detected by performing analysis the inspection sheet thus read to thereby manufacture an adjusted printer, the method including making the unadjusted printer print at least two first markers using black ink, and making the unadjusted printer print at least two second markers using chromatic color ink, wherein the second marker has a shape in which the chromatic color ink is applied in a region in which the black ink is not applied in the first marker when a central position of the second marker is aligned with a central position of the first marker, and a position of the inspection pattern in the inspection sheet is identified based on a position of a marker determined by the analysis.

BRIEF DESCRIPTION OF THE DRAWINGS

FIG. 5 is a diagram showing inter-marker distances.

FIGS. 11A-11B are diagrams showing the inter-marker distances.

FIGS. 13A-13B are illustration diagrams of the marker set detection processing.

DESCRIPTION OF EMBODIMENTS

First Embodiment

Figure 1:
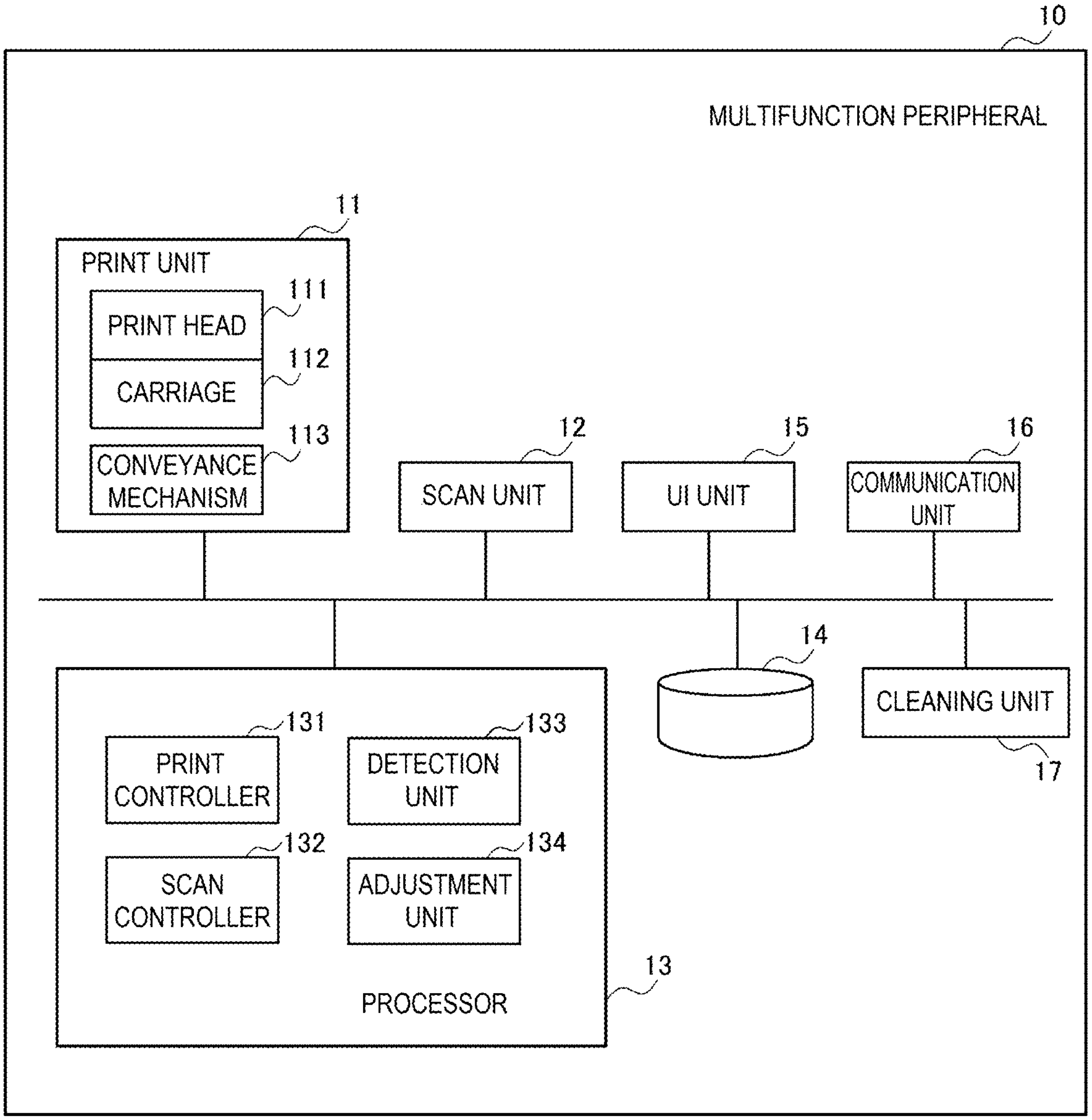
FIG. 1 is a configuration diagram of a multifunction peripheral.

FIG. 1 is a configuration diagram of a multifunction peripheral 10 according to a first embodiment. The multifunction peripheral 10 has a print function and a scanner function. The multifunction peripheral 10 may have other functions such as FAX. The multifunction peripheral 10 is an example of a printer. The multifunction peripheral 10 includes a print unit 11, a scan unit 12, a processor 13, a nonvolatile memory 14, a UI unit 15, a communication unit 16, and a cleaning unit 17. The print unit 11 includes a print head 111, a carriage 112, and a conveyance mechanism 113.

The multifunction peripheral 10 of the present embodiment is assumed to perform monochrome printing, and the print head 111 includes a single nozzle array corresponding to black (K) ink, and performs printing with a serial inkjet system. The nozzle array includes a plurality of nozzles, and the ink is ejected from each of the nozzles. The ink of each of the nozzles is supplied from an ink tank (not shown) or the like. By the ink being ejected from each of the nozzles of the print head 111, a droplet (dot) of the ink is formed on the medium (form).

The print head 111 is mounted on the carriage 112, the carriage 112 reciprocates along a specific direction under the control of the processor 13, and accordingly, the print head 111 reciprocates in the specific direction. The direction in which the print head 111 reciprocates is referred to as a main scanning direction. The conveyance mechanism 113 is a device that conveys a medium as a print target. The conveyance mechanism 113 conveys the form in a direction perpendicular to the main scanning direction of the print head 111. Here, the direction perpendicular to the main scanning direction of the print head 111, that is, the direction in which the form is conveyed is referred to as a sub-scanning direction.

In the nozzle array of the print head 111, a plurality of nozzles are arranged at regular intervals along the sub-scanning direction. The ejection of the ink from the nozzles in the process of the reciprocation of the print head 111 and the conveyance of the medium by the conveyance mechanism 113 are repeated to thereby perform printing on the medium. The cleaning unit 17 suctions the ink to thereby clean the ink clogging of the nozzles.

The scan unit 12 includes a light source and a light receiving element that receives light from a scanning target. A Complementary Metal Oxide Semiconductor (CMOS) line sensor of a Contact Image Sensor (CIS) type is used as the scan unit 12 in the present embodiment. Further, as another example, the scan unit 12 may be a sensor of a Charge Coupled Device (CCD) type. The arrangement direction of the light receiving elements in the line sensor will hereinafter be referred to as the main scanning direction of the scan unit 12.

Figure 2:
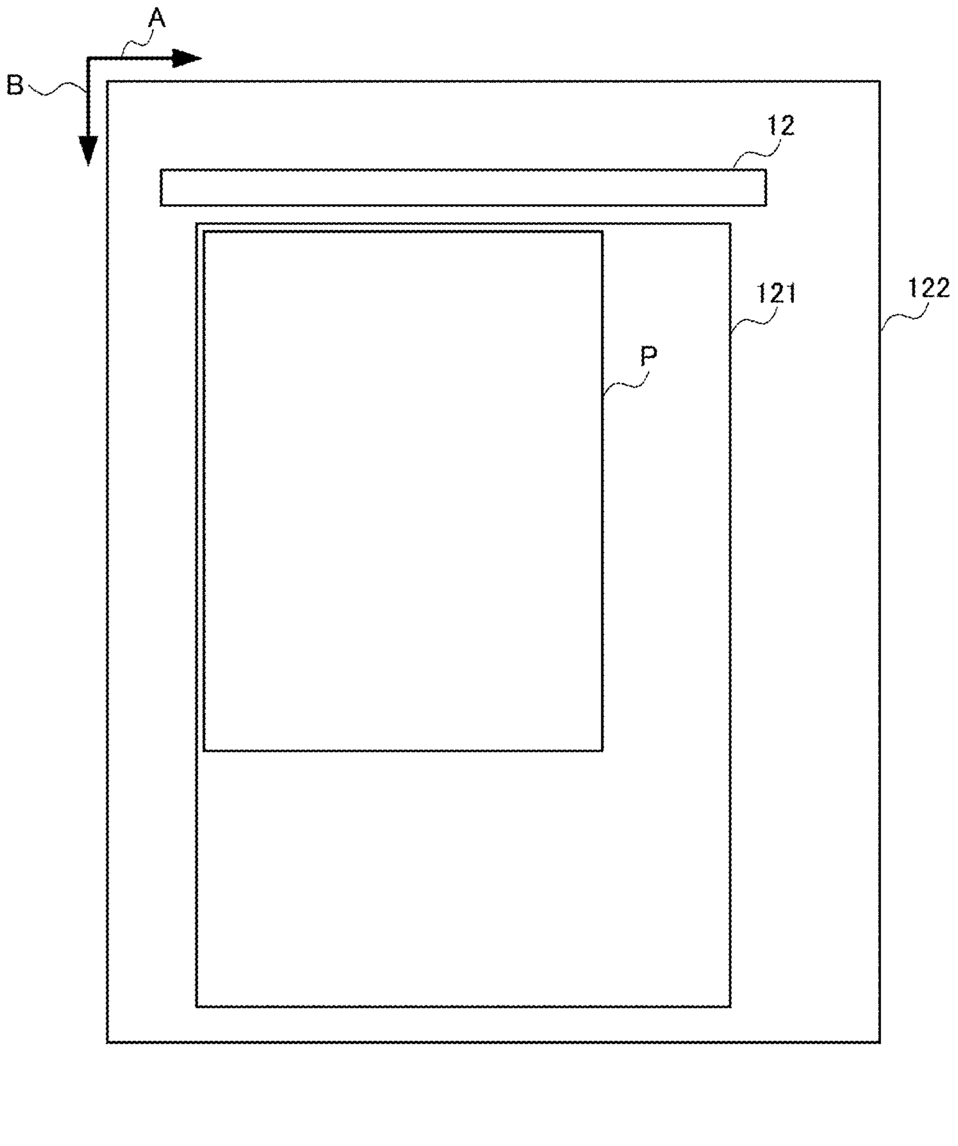
FIG. 2 is a diagram showing a positional relationship between a scan unit and a medium.

As illustrated in FIG. 2, the multifunction peripheral 10 includes a medium table 122 provided with a glass surface 121 on which an object P of reading is placed. That is, the multifunction peripheral 10 includes a flatbed type scanner including a scan unit 12, a glass surface 121, and a medium table 122. The scan unit 12 moves in a direction B perpendicular to the main scanning direction A on the glass surface 121 under the control of the processor 13. The direction perpendicular to the main scanning direction is hereinafter referred to as a sub-scanning direction of the scan unit 12. The scan unit 12 repeats reading while moving in the sub-scanning direction by a predetermined amount to thereby read the whole of the object P.

In the present embodiment, it is assumed that the relative position of the object P and the scan unit 12 changes as the scan unit 12 moves with respect to the object P placed thereon. However, as another example, the relative position may be changed by the medium being conveyed in the sub-scanning direction by the conveyance mechanism 113 with respect to the scan unit 12 fixed.

The processor 13 includes a RAM, a CPU, and so on. The nonvolatile memory 14 stores various types of data and programs. The processor 13 can execute a program stored in the nonvolatile memory 14. The UI unit 15 includes an input unit for receiving input from a user, and a display unit for displaying various types of information to the user. The communication unit 16 communicates with an external device such as a PC or a tablet terminal coupled with wired communication, wireless communication, or the like.

In the multifunction peripheral 10 in the present embodiment, the print unit 11 prints inspection patterns on the medium. Here, the inspection patterns are an image in which predetermined patterns are shown at predetermined positions. The multifunction peripheral 10 can adjust the control contents of the print unit 11 by scanning the inspection sheet on which the inspection patterns are printed and performing an image analysis. Examples of the adjustment include correction of the medium conveyance deviation (PF deviation, Paper Feed deviation) and correction of the deviation (Bi-D) of the dot formation position caused by the relative positional movement of the print unit 11 and the medium in the reciprocation in the main scanning direction. Note that it is sufficient for the target of the adjustment to be able to be adjusted based on the inspection patterns, and the target of the adjustment is not limited to the embodiment. For example, in the present embodiment, the inspection patterns also include a nozzle inspection pattern for confirming presence or absence of nozzle clogging, and when the occurrence of the nozzle clogging is detected from the nozzle inspection pattern, cleaning is performed by the cleaning unit 17 as an adjustment of the print unit 11.

The processor 13 in the present embodiment includes a print controller 131, a scan controller 132, a detection unit 133, and an adjustment unit 134 as a functional configuration for adjusting the setting of the print unit 11 using the inspection patterns. Functions of the print controller 131, the scan controller 132, the detection unit 133, and the adjustment unit 134 are realized by the processor 13 retrieving a program stored in the nonvolatile memory 14 and then executing the program. That is, in the following description, the processing described as being executed by the print controller 131, the scan controller 132, the detection unit 133, and the adjustment unit 134 is processing to be executed by the processor 13.

The print controller 131 controls the print unit 11. The scan controller 132 controls the scan unit 12. The detection unit 133 detects predetermined markers and inspection patterns in the scanned image. The detection unit 133 further performs matching by comparing each of the markers and the inspection patterns thus detected with reference markers and reference patterns corresponding thereto. Note that it is assumed that the reference markers and the reference patterns referred to in the matching processing are stored in advance in the nonvolatile memory 14. The adjustment unit 134 adjusts the setting of the print unit 11 based on the result of detection by the detection unit 133.

Figure 3:
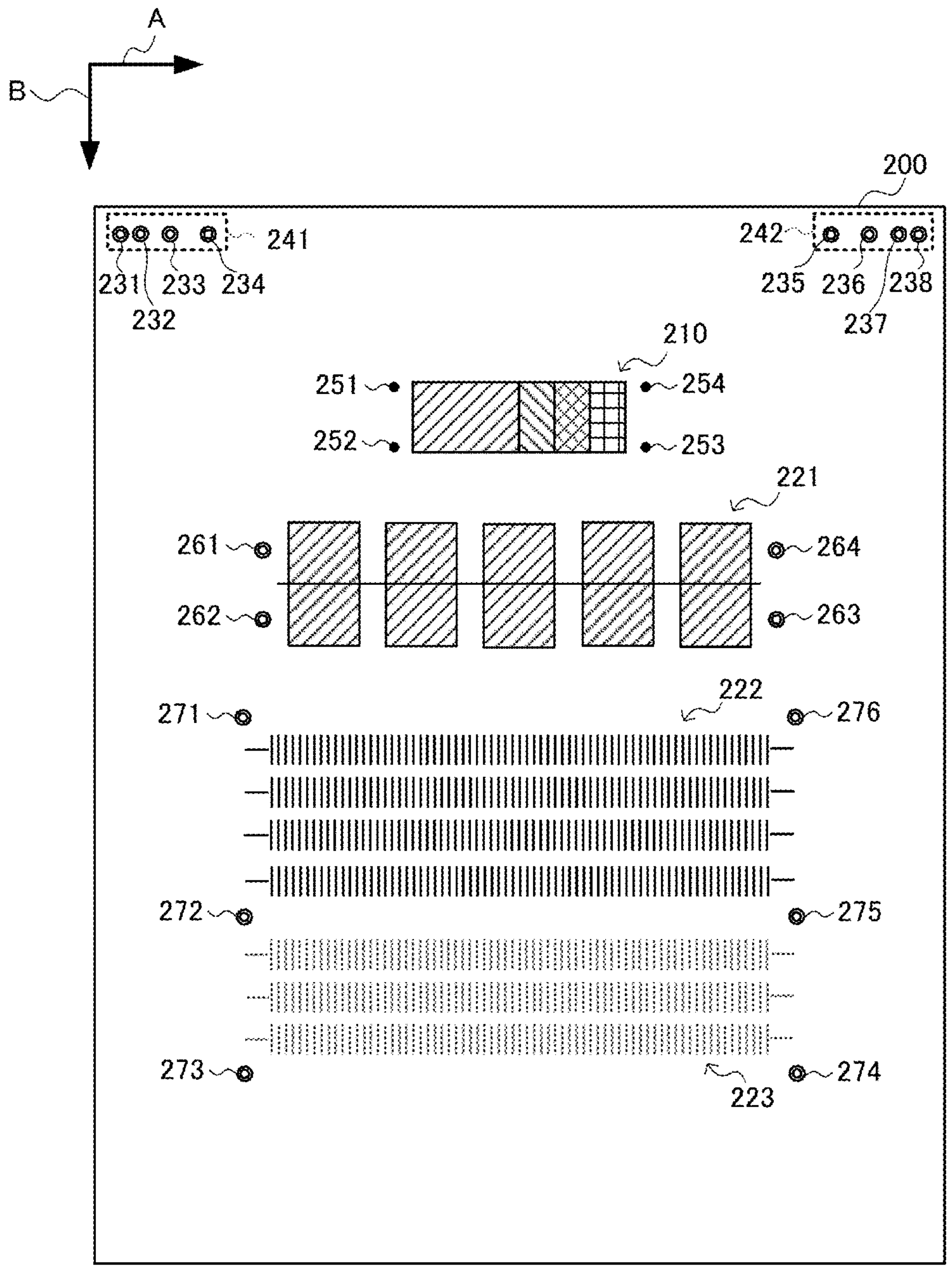
FIG. 3 is a diagram showing an inspection sheet.

FIG. 3 is a diagram illustrating an example of the inspection sheet. The print head 111 prints the inspection patterns on the inspection sheet 200 under the control of the print controller 131. Note that in the inspection sheet 200, a side which is printed first out of the sides parallel to the main scanning direction is referred to as an upper side, and the other side is referred to as a lower side. Further, when setting the inspection sheet 200 so that the upper side is located at an upper side, out of the sides of the inspection sheet 200 parallel to the sub-scanning direction, the right side in the front view of the inspection sheet 200 is referred to as a right side, and the other side is referred to as a left side.

On the inspection sheet 200, the nozzle inspection pattern 210 for confirming the presence or absence of nozzle clogging and other inspection patterns 221 to 223 are printed. The nozzle inspection pattern 210 is a pattern for confirming the presence or absence of, or a degree of nozzle clogging. The other inspection patterns 221 to 223 are patterns for adjusting the control contents such as the medium conveyance deviation and the deviation of the dot formation position described above.

A plurality of nozzle markers 231 to 238, which are markers for specifying the position of the nozzle inspection pattern 210, is further printed on the upper portion of the inspection sheet 200. A plurality of position tilt markers 251 to 254 for correcting the position and the tilt of the nozzle inspection pattern 210 are printed in the vicinity of the nozzle inspection pattern 210. In addition, a plurality of position tilt markers 261 to 264 for specifying the positions of the other inspection pattern 221 are printed in the vicinity of the other inspection pattern 221. Similarly, position tilt markers 271 to 276 are also printed in the vicinity of the other inspection patterns 222, 223. It is assumed that image data of the nozzle markers 231 to 238, the nozzle inspection pattern 210, the other inspection patterns 221 to 223, and the position tilt markers 251 to 254, 261 to 264, and 271 to 276 are stored in advance in the nonvolatile memory 14. As another example, it may be assumed that the image data is stored in an external device and is transmitted from the external device to the multifunction peripheral 10.

The nozzle markers 231 to 238 are arranged at predetermined relative positions with respect to the nozzle inspection pattern 210 so as to have a known positional relationship with reference to the nozzle inspection pattern 210. Specifically, the nozzle markers 231 to 234 are printed in a left region 241 located above and at the left side (end side) of the nozzle inspection pattern 210. The nozzle markers 234 to 238 are printed in a right region 242 located above and at the right side (end side) of the nozzle inspection pattern 210.

The left region 241 and the right region 242 are both disposed at the end side of the nozzle inspection pattern 210 and the other inspection patterns 221 to 223 in the left-right direction of the inspection sheet 200. That is, the nozzle markers 231 to 238 are all printed at the end side of the nozzle inspection pattern 210 and the other inspection patterns 221 to 223 in the left-right direction of the inspection sheet 200. As described above, by arranging the nozzle markers 231 to 238 at the end side, it is possible to improve the accuracy of the position detection using the nozzle markers 231 to 238. Note that the nozzle markers 231 to 238 may not be printed at the end side of the respective position tilt markers 251 to 254, 261 to 264, and 271 to 276.

Four position tilt markers 251 to 254 are arranged at different positions with respect to the nozzle inspection pattern 210. Specifically, the position tilt markers 251 to 254 are arranged at vertexes of a rectangle having two sides in the main scanning direction and the sub-scanning direction at the outside of the nozzle inspection pattern 210. In this way, the four position tilt markers 251 to 254 are arranged to form a rectangle of a known size.

Further, the relationship (relative positional relationship) between the position of the position tilt marker 251 and the relative position of the upper left vertex of the nozzle inspection pattern 210 is set in advance. Therefore, the processor 13 can perform the pattern detection of the nozzle inspection pattern 210 using the position of the position tilt marker 251 as a landmark.

Further, the relationship (relative positional relationship) between the position of the position tilt marker 251 and the relative position of the upper left vertex of the nozzle inspection pattern 210 is set in advance. Therefore, the processor 13 can perform the pattern detection of the nozzle inspection pattern 210 using the position of the position tilt marker 251 as a landmark. Further, as described above, the processor 13 can specify the presence or absence of distortion, tilt, and so on in the scanned image based on the sizes of the four rectangular position inspection markers and the size of the known rectangle, and appropriately perform correction. Similarly, the position tilt markers 271 to 276 are arranged around the other inspection patterns 221 to 223, and based thereon, the other inspection patterns 222, 223 can be detected and corrected as appropriate.

Figure 4:
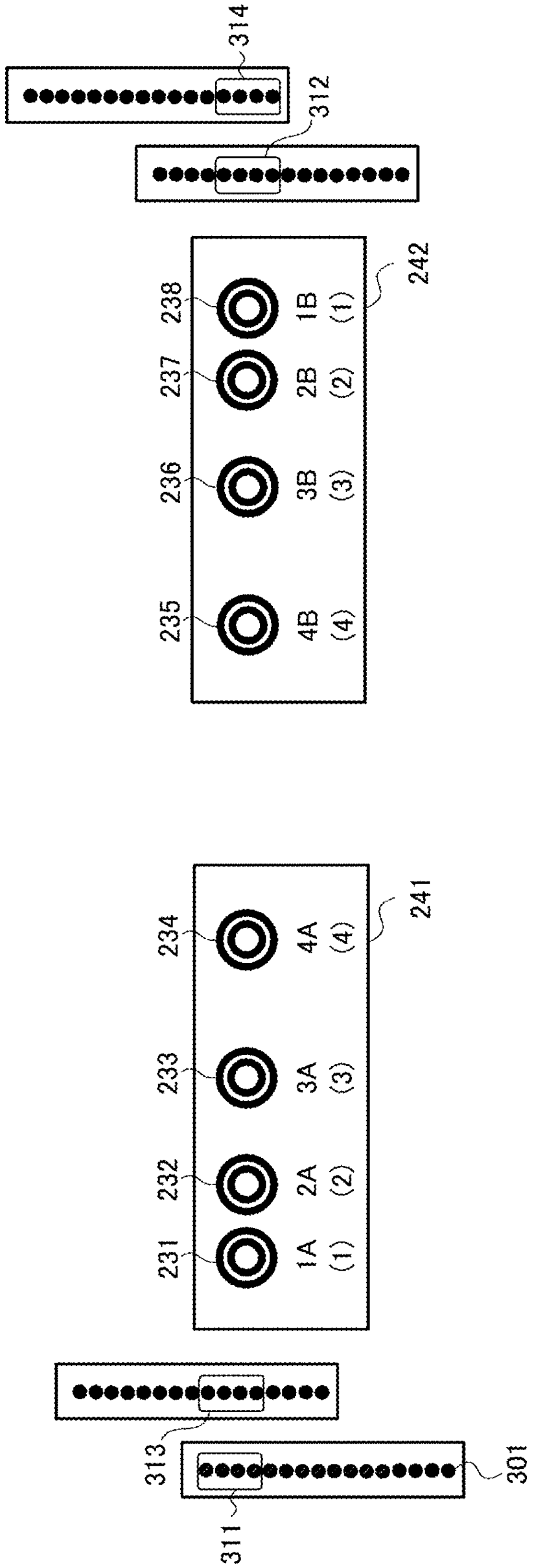
FIG. 4 is an illustration diagram of nozzle arrays and nozzle markers.

FIG. 4 is an illustration diagram of the nozzle arrays and the nozzle markers 231 to 238. In the present embodiment, each of the nozzle markers 231 to 238 has a double-wheeled shape, and has the same size and the same shape.

As described above, the nozzle markers 231 to 238 are divided into and printed in the left region 241 and the right region 242 of the inspection sheet 200. Further, each of the nozzle markers 231 to 238 is printed by a specific nozzle group. In the present embodiment, the plurality of nozzles 301 provided to the nozzle array 300 of the print head 111 are divided into four nozzle groups (the first nozzle group 311 to the fourth nozzle group 314), and one nozzle marker in the left region 241 and one nozzle marker in the right region 242 are printed by the same nozzle group.

In the present embodiment, the plurality of nozzles 301 are divided into four nozzle groups, namely a first nozzle group 311, a second nozzle group 312, a third nozzle group 313, and a fourth nozzle group 314. The nozzle groups each include the nozzles different from the nozzles of other nozzle groups. In the present embodiment, out of the sixteen nozzles, the first to fourth nozzles belong to the first nozzle group 311, the fifth to eighth nozzles belong to the second nozzle group 312, the ninth to twelfth nozzles belong to the third nozzle group 313, and the thirteenth to sixteenth nozzles belong to the fourth nozzle group 314. Although it is possible to arrange that some nozzles belong to a plurality of nozzle groups, it is preferable that no nozzles belong to a plurality of nozzle groups in common as in the present embodiment.

Then, one nozzle marker in the left region 241 and one nozzle marker in the right region 242 are printed by each nozzle group. In the following, a combination of one nozzle marker in the left region 241 and one nozzle marker in the right region 242 printed by the same nozzle group is referred to as a marker set.

In the present embodiment, first, the nozzle markers 231, 238 are printed by the first nozzle group 311. Subsequently, paper feed is performed, and then the nozzle markers 232, 237 are printed by the second nozzle group 312. Subsequently, the paper feed is performed, and then the nozzle markers 233, 236 are printed by the third nozzle group 313. Subsequently, the paper feed is performed, and then the nozzle markers 234, 235 are printed by the fourth nozzle group 314.

The nozzle markers 231, 238 printed by the first nozzle group 311 are hereinafter referred to as a first A marker and a first B marker, respectively, and these are referred to as a first marker set for the sake of convenience of explanation. Further, the nozzle markers 232, 237 printed by the second nozzle group 312 are referred to as a second A marker and a second B marker, respectively, and these markers are referred to as a second marker set. Further, the nozzle markers 233, 236 printed by the third nozzle group 313 are referred to as a third A marker and a third B marker, respectively, and these markers are referred to as a third marker set. Further, the nozzle markers 234, 235 printed by the fourth nozzle group 314 are referred to as a fourth A marker and a fourth B marker, respectively, and these markers are referred to as a fourth marker set.

Further, in the present embodiment, the print unit 11 prints two nozzle markers belonging to the same marker set in the same path. That is, the print unit 11 prints the first A marker and the first B marker in the same pass, and prints the second A marker and the second B marker in the same pass. Further, the print unit 11 prints the third A marker and the third B marker in the same pass, and prints the fourth A marker and the fourth B marker in the same pass. As a result, it is possible to prevent the positions of the two nozzle markers in the same marker set from being displaced in the sub-scanning direction due to the fact that the paths are different.

In addition, in the present embodiment, the print unit 11 prints all the markers (the first A marker, the first B marker, the second A marker, the second B marker, the third A marker, the third B marker, the fourth A marker, and the fourth B marker) in the same row, that is, at the same position in the sub-scanning direction. As a result, a range occupied by each of the nozzle markers in the inspection sheet 200 can be reduced.

The detection unit 133 detects each of the nozzle markers 231 to 238. Here, the processing of the detection unit 133 will be described. Detection of the nozzle markers 231 to 238 is performed by pattern matching with image data (reference markers) of the nozzle markers stored in advance in the nonvolatile memory 14. In the pattern matching, the detection unit 133 sets a range of a predetermined number of pixels with reference to the upper left vertex as a comparison area in the scanned image, and performs the comparison with the reference marker in each comparison area while shifting the comparison area by pixel.

Specifically, the detection unit 133 compares the pixel values (luminance values) of the corresponding pixels between the comparison area and the reference marker. Then, the detection unit 133 obtains the total value of absolute values of the differences between the pixel values (luminance values) obtained by the comparison. When a perfect match occurs, the sum of the differences is zero, theoretically. The detection unit 133 obtains a match rate based on the total value of the differences. The match rate is a value that takes 100% when the total value of the differences is zero, and that decreases as the total value of the differences increases. Then, the detection unit 133 detects the comparison area in which the match rate is maximized as any range of the nozzle markers 231 to 238, and identifies the center of this range as the nozzle marker position.

The detection unit 133 of the present embodiment identifies the position of the nozzle inspection pattern 210 by triangulation using two nozzle markers belonging to the marker set. As described above, since the distance between the markers becomes relatively long by using the nozzle markers disposed in the left region 241 and the right region 242, the detection accuracy of the nozzle inspection pattern 210 can be improved.

When one marker set is detected, the position of the nozzle inspection pattern 210 can be identified based on the positional relationship between the two nozzle markers belonging to the marker set detected. However, when nozzle clogging has occurred in any of the plurality of nozzles 301, the nozzle marker cannot be printed correctly. Therefore, it is assumed that the multifunction peripheral 10 of the present embodiment prints a plurality of marker sets with the nozzle groups. Thus, even when nozzle clogging occurs in any of the nozzle groups, the nozzle inspection pattern 210 can be detected as long as the marker set is correctly printed by any other nozzle groups.

However, since all the nozzle markers are the same in size and shape, the detection unit 133 cannot determine which one of the eight nozzle markers the detected nozzle marker is. Therefore, in the present embodiment, the printing position of each nozzle marker is set such that the distance between the two nozzle markers belonging to each of the marker sets (inter-marker distance) is a unique length. Therefore, the detection unit 133 can determine which nozzle marker is detected based on the inter-marker distance.

FIG. 5 is a diagram showing the inter-marker distances for all the combinations of the nozzle markers in the left region 241 and the nozzle markers in the right region 242. It is assumed that these inter-marker distances are registered in the nonvolatile memory 14 in association with the corresponding two nozzle markers. In the present embodiment, the first A marker, the second A marker, the third A marker, and the fourth A marker are respectively disposed at positions 3, 5, 8, and 12 from the left side, and the first B marker, the second B marker, the third B marker, and the fourth B marker are respectively arranged at positions 51, 49, 46, and 42 from the left side. As a result, the inter-marker distance between the first A marker and the first B marker is 48.

Further, the inter-marker distance between the second A marker and the second B marker is 44, the inter-marker distance between the third A marker and the third B marker is 38, and the inter-marker distance between the fourth A marker and the fourth B marker is 30. These inter-marker distances are different from the inter-marker distance between any other two markers. Note that, for example, the inter-marker distance between the third A marker and the first B marker is 43, which is equal to the inter-marker distance between the first A marker and the third B marker. In this way, the inter-marker distance between the two nozzle markers other than the marker set corresponding to each of the nozzle groups may be equal to the inter-marker distance between other two of the nozzle markers.

As described above, in the present embodiment, the inter-marker distance between the two nozzle markers belonging to each marker set in the inspection sheet 200 is set as a unique length. More particularly, the inter-marker distance between the two nozzle markers in each marker set is made different from the inter-marker distances between any other two nozzle markers. Accordingly, the detection unit 133 can determine which nozzle marker is detected based on the inter-marker distance.

Figure 6:
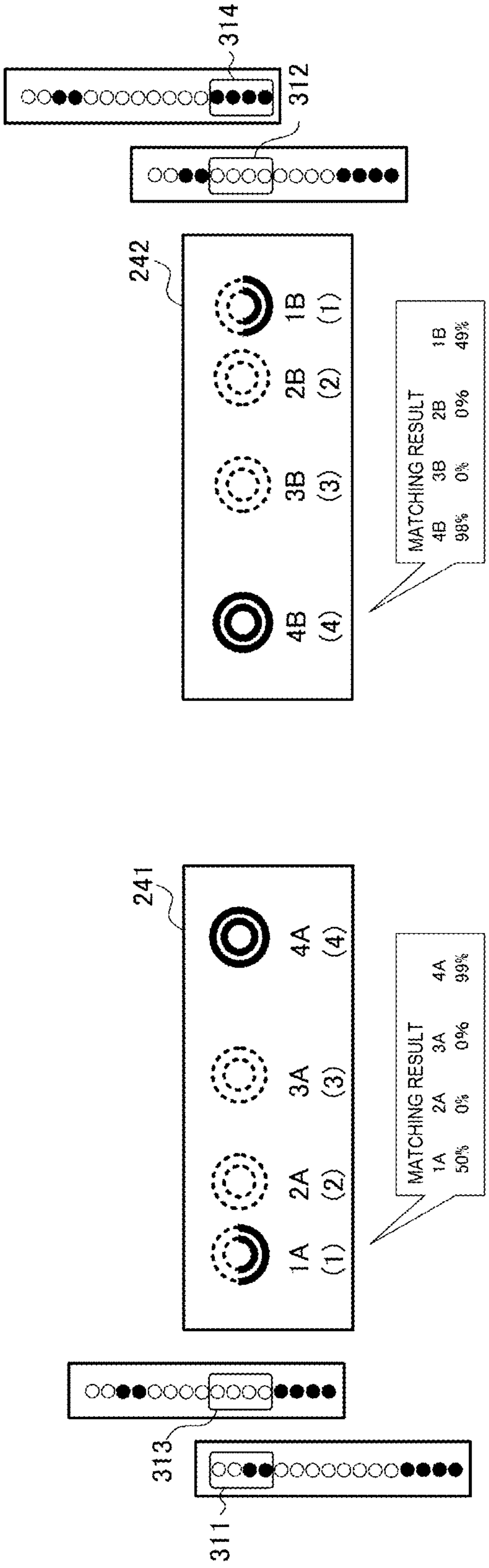
FIG. 6 is an illustration diagram of marker set detection processing.
Figures 7, 8:
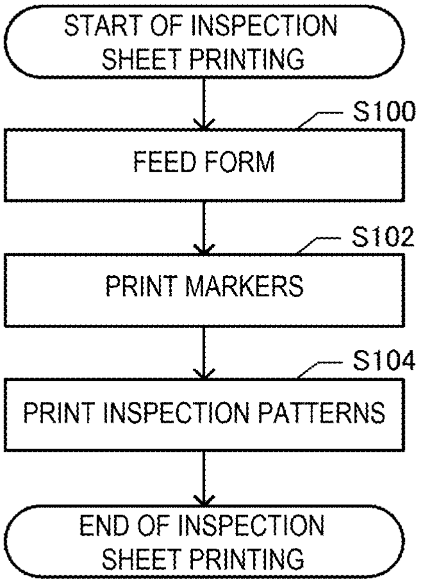
FIG. 7 is an illustration diagram of the marker set detection processing.
FIG. 8 is a flowchart representing inspection sheet print processing.

FIG. 6 and FIG. 7 are illustration diagrams of marker set detection processing. For example, it is assumed that the first and second nozzles and the fifth to twelfth nozzles are clogged as shown in FIG. 6. In this case, as shown in FIG. 6, half of the first A marker and the first B marker are printed. Further, the second A marker, the second B marker, the third A marker, and the third B marker are not printed. The fourth A marker and the fourth B marker are normally printed. Then, in the matching by the detection unit 133, as shown in FIG. 6, the matching rate is 50% for the first A marker and 49% for the first B marker. The match rates of the second A marker, the second B marker, the third A marker, and the third B marker are all 0%. The match rate of the fourth A marker is 99%, and the match rate of the fourth B marker is 98%. When a recognition accuracy (threshold value) available for detecting the position of the nozzle inspection pattern 210 is set to 60% or higher, only the fourth marker set is available.

In this case, the detection unit 133 can obtain the inter-marker distance of 30 based on the detection positions of the two nozzle markers. As shown in FIG. 7, the inter-marker distance is 30 only in the fourth marker set formed of the fourth A marker and the fourth B marker. Therefore, the detection unit 133 determines that the nozzle markers detected are the fourth A marker and the fourth B marker based on the inter-marker distance.

Then, a method of manufacturing the multifunction peripheral 10 as a printer will be described. In the manufacturing method according to the present embodiment, by performing the adjustment using the inspection pattern on the multifunction peripheral 10 which is not adjusted (incomplete), the multifunction peripheral 10 which is adjusted is manufactured. Here, in the incomplete multifunction peripheral 10, mechanical parts and electrical parts are assembled to make it possible to perform a printing operation, but the adjustment related to printing is not performed, and the adjustment related to printing is performed by the present manufacturing method to thereby obtain a finished product of the multifunction peripheral 10. Note that the manufacturing method is performed as a part of a manufacturing process in a factory, or is performed after installation of the incomplete multifunction peripheral 10 in customer's site.

Figure 9:
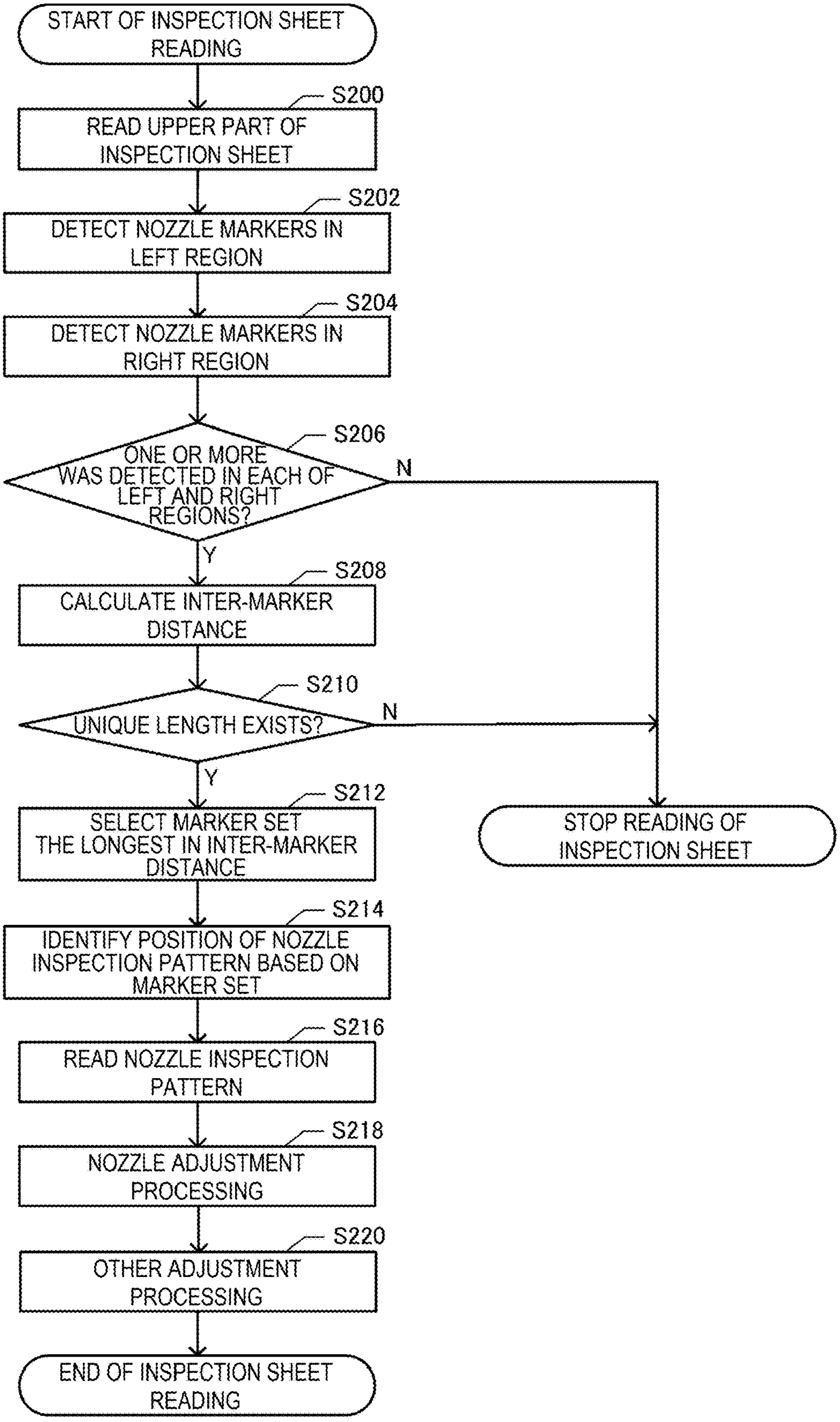
FIG. 9 is a flowchart representing inspection sheet read processing.

The manufacturing method includes inspection sheet print processing and inspection sheet read processing. FIG. 8 is a flowchart illustrating the inspection sheet print processing. FIG. 9 is a flowchart illustrating the inspection sheet read processing. As illustrated in FIG. 8, in the inspection sheet print processing, first, the user feeds a form to the multifunction peripheral 10 (step S100). Then, the various markers of the inspection sheet 200 are printed by the print unit 11 of the incomplete multifunction peripheral 10 (step S102), and the various inspection patterns of the inspection sheet 200 are printed by the print unit 11 (step S104). Note that printing of the various markers and the various inspection patterns is performed in the order from an upper part of the form along the sub-scanning direction in accordance with the conveyance of the medium while the print head 111 moves in the main scanning direction. As a result, printing of the inspection sheet is completed.

Then, the inspection sheet read processing will be described with reference to FIG. 9. The inspection sheet is set on the glass surface 121 by the user, and a user operation for starting scanning is performed. In response to this, the scan controller 132 starts driving the scan unit 12 and reads the upper portion of the inspection sheet 200 (step S200). Here, the upper portion is a range that is set in advance so as to include the positions of the nozzle markers 231 to 238, and is a range that is set in advance in the sub-scanning direction of the scan unit 12.

Then, the detection unit 133 detects the nozzle markers in the left region 241 in the scanned image obtained in step S200 (step S202). Specifically, the detection unit 133 detects the nozzle markers in the range of the left half of the scanned image read in step S200. Subsequently, the detection unit 133 detects the nozzle markers in the right region 242 in the scanned image obtained in step S200 (step S204). Specifically, the detection unit 133 detects the nozzle markers in the range of the right half in the main scanning direction of the scanned image read in step S200.

Then, in step S206, the detection unit 133 determines whether at least one nozzle marker was detected in each of the left region 241 and the right region 242 (step S206). It is assumed that the detection unit 133 determines that the nozzle marker was detected when the match rate is equal to or higher than a threshold value (for example, 60%).

When one or more nozzle markers were not successfully detected in at least one of the left region 241 and the right region 242 (N in step S206), the process is stopped. In this case, since there is a possibility that the upper and lower sides of the inspection sheet are reversed or the back and forth surfaces are reversed, the processor 13 notifies the user of an error in the UI unit 15.

When one or more nozzle markers are successfully detected in both the left region 241 and the right region 242 (Y in step S206), the detection unit 133 calculates the inter-marker distances for all the combinations of the nozzle markers in the left region 241 and the nozzle markers in the right region 242 (step S208).

Then, the detection unit 133 confirms whether there is one having the unique length in the inter-marker distances calculated. For example, in the example described with reference to FIG. 4 and FIG. 5, the distances of 48, 44, 38, and 30 are the unique lengths. When the inter-marker distance having the unique length was obtained, it is determined that the two nozzle markers detected are the marker set associated with the unique length. When there is no inter-marker distance having the unique length (N in step S210), the detection unit 133 fails to detect the nozzle markers, and therefore cannot detect the nozzle inspection pattern 210, and thus stops the processing.

When there is the inter-marker distance having the unique length (Y in step S210), the detection unit 133 selects the marker set the longest in inter-marker distance (step S212). Then, the detection unit 133 identifies the position of the nozzle inspection pattern 210 based on the detection positions of the two nozzle markers belonging to the marker set selected in step S212 (step S214). The relative positional relationship between the two nozzle markers and the nozzle inspection pattern 210 in all the marker sets (four marker sets in the example in FIG. 4 and FIG. 5) is set in advance. Then, the detection unit 133 refers to the positional relationship to thereby identify the position (range) of the nozzle inspection pattern 210 based on the detection positions of the two nozzle markers.

As described above, in the present embodiment, since the detection unit 133 identifies the position of the nozzle inspection pattern 210 using the marker set the longest in inter-marker distance, it is possible to more accurately identify the position of the nozzle inspection pattern.

Then, the detection unit 133 detects the nozzle inspection pattern 210 by reading the position identified in step S214 (step S216). Then, the adjustment unit 134 adjusts the nozzles 301 based on the detection result of the nozzle inspection pattern 210 (step S218).

Specifically, the adjustment unit 134 executes processing of cleaning the nozzles 301 in accordance with the matching result between the nozzle inspection pattern 210 and the reference pattern set in advance corresponding to the nozzle inspection pattern 210. Specifically, when the matching rate with the nozzle inspection pattern is equal to or higher than a first threshold value, the adjustment unit 134 determines that cleaning is not necessary. When the match rate is lower than the first threshold value and equal to or higher than a second threshold value, the adjustment unit 134 causes the cleaning unit 17 to perform cleaning low in intensity. Further, when the matching rate is lower than the second threshold value, the adjustment unit 134 causes the cleaning unit 17 to perform cleaning high in intensity. Here, the second threshold value is a value lower than the first threshold value, and when the cleaning intensity is high, the suction force becomes stronger than when the cleaning intensity is low. When the degree of nozzle clogging is high, the nozzle inspection pattern 210 cannot be accurately printed, and thus the matching rate is lowered. Thus, the adjustment unit 134 executes the cleaning of the nozzles with an intensity corresponding to the matching rate, that is, with an intensity corresponding to the condition of the nozzle clogging.

Subsequently, the processor 13 performs other adjustment processing by reading the other inspection patterns 221 to 223 while using the position tilt markers 261 to 274 (step S220). In the other adjustment processing, the processor 13 generates adjustment parameters of the print unit 11 based on the detection results of the other inspection patterns 221 to 223, and stores the adjustment parameters in the nonvolatile memory 14. With that, the adjustment of the multifunction peripheral 10 is completed, and the manufacturing of the completed multifunction peripheral 10 is finished.

As described above, the multifunction peripheral 10 of the present embodiment can reliably detect the nozzle inspection pattern even when nozzle clogging occurs in some of the nozzles. Further, the matching processing can be speeded up by making the nozzle markers for detecting the nozzle inspection pattern the same in size and shape. Further, by setting the inter-marker distance of each marker set to be the unique length, it is possible to determine which marker set the two nozzle markers detected belong to.

A first modified example of the first embodiment will be described. In the first embodiment, it is assumed that each nozzle group includes the nozzles different from the nozzles of other nozzle groups, but one nozzle may belong to a plurality of nozzle groups. For example, the first to fifth nozzles may belong to the first nozzle group, the fifth to ninth nozzles may belong to the second nozzle group, the ninth to thirteenth nozzles may belong to the third nozzle group, and the twelfth to sixteenth nozzles may belong to the fourth nozzle group.

Although it is assumed that the plurality of nozzles are divided into the four nozzle groups, and the four marker sets are printed on the inspection sheet in the present embodiment, but as a second modified example, the number of divisions of the nozzles is not limited to the embodiment. It is sufficient that the plurality of nozzles are divided into two or more nozzle groups, and two or more marker sets are printed. That is, the plurality of nozzles may be divided into three nozzle groups, and the three marker sets may be printed, or the plurality of nozzles may be divided into five or more nozzle groups, and the five or more marker sets may be printed.

Second Embodiment

Then, the multifunction peripheral 10 according to a second embodiment will be described focusing mainly on differences from the multifunction peripheral 10 according to the first embodiment. The print head 111 of the multifunction peripheral 10 according to the second embodiment includes nozzle arrays corresponding respectively to four kinds of chromatic color ink of CMYK (C: cyan, M: magenta, Y: yellow, and K: black), and performs printing by the inkjet system.

Figure 10:
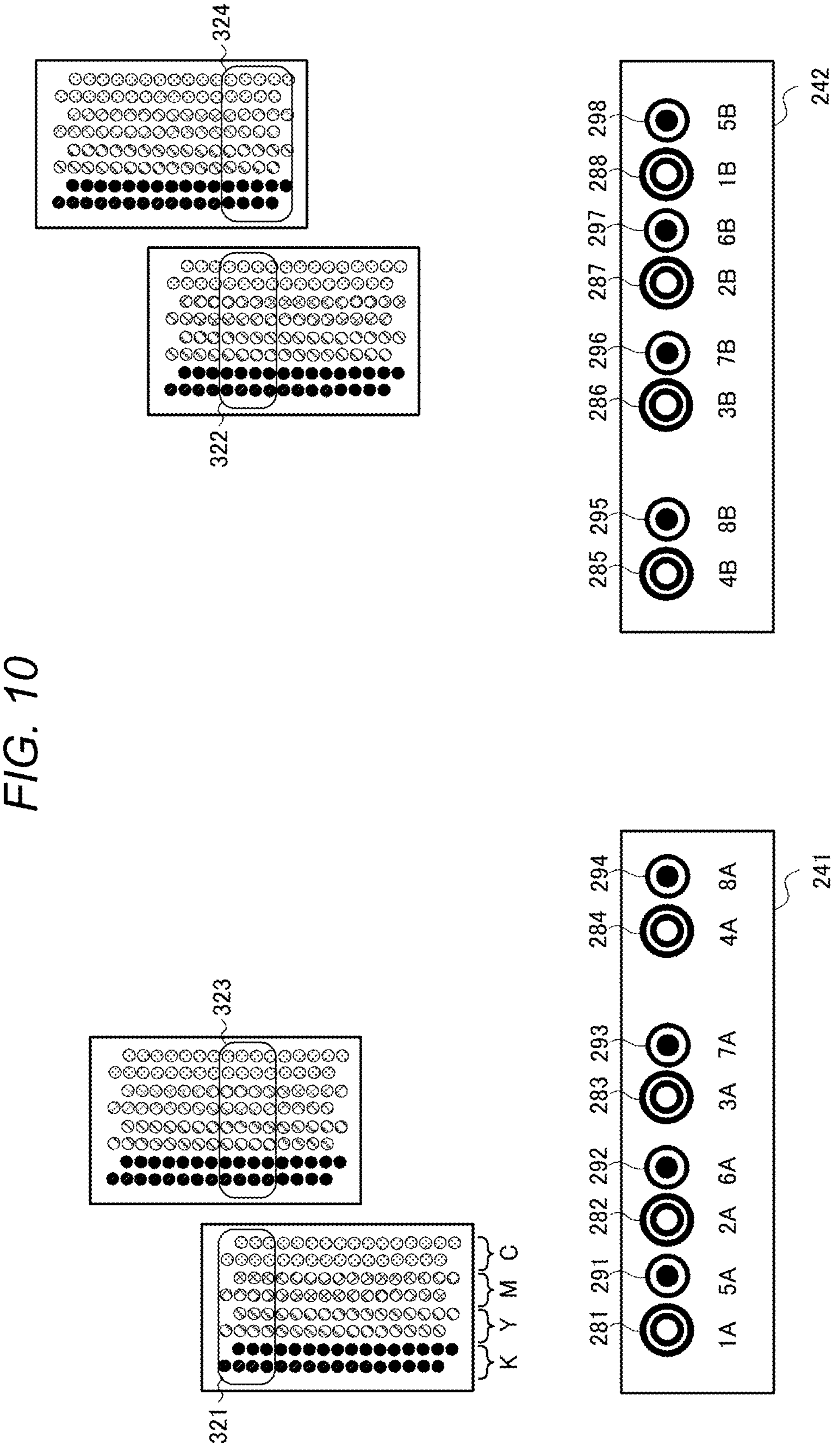
FIG. 10 is an illustration diagram of nozzle arrays and nozzle markers according to a second embodiment.

FIG. 10 is an illustration diagram of the nozzle arrays of the respective colors and the nozzle markers in the second embodiment. In the second embodiment, the first nozzle markers 281 to 288 are printed on the inspection sheet 200 with K ink similarly to the first embodiment. Further, second nozzle markers 291 to 298 with composite black are printed with C ink, M ink, and Y ink. The first nozzle markers 281 to 284 and the second nozzle markers 291 to 294 are printed in the left region 241. The first nozzle markers 285 to 288 and the second nozzle markers 295 to 298 are printed in the right region 242.

The first nozzle markers 281 to 288 are examples of the first marker, and the second nozzle markers 291 to 298 are examples of the second marker. Further, it is sufficient for the second nozzle markers 291 to 298 to be markers printed as at least one chromatic color marker.

The first nozzle markers 281 to 288 using the K ink are all markers the same in size and shape and each having a shape of a double wheel applied with no ink at the center. Further, the second nozzle markers 291 to 298 with the chromatic color ink are all markers the same in size and shape and each provided with a black circle disposed at the center and a ring surrounding the black circle. The second nozzle marker 291 formed of the chromatic color ink is a marker having a shape in which a region which the ink is to be applied to does not overlap the first nozzle marker 281 printed with the K ink when the center position is aligned with that of the first nozzle marker 281.

Note that the second nozzle marker 291 is not limited to the embodiment as long as it has a shape in which the ink is applied to a region where no ink is applied in the first nozzle marker 281 when the center position is aligned with that of the first nozzle marker 281 to be printed with the K ink. For example, the second nozzle marker 291 may have a part overlapping the first nozzle marker 281. For example, the second nozzle marker 291 may be a triangular double wheel.

Also in the present embodiment, the plurality of nozzles provided to the nozzle arrays of the respective colors are divided into four nozzle groups, namely the first nozzle group to the fourth nozzle group. Then, the first nozzle marker 281 (first A marker) and the first nozzle marker 288 (first B marker) are printed with the K ink of the first nozzle group 321. Further, the second nozzle markers 291, 298 with the composite black are printed with the C ink, the M ink, and the Y ink of the first nozzle group 321. The second nozzle markers 291, 298 are hereinafter referred to as a fifth A marker and a fifth B marker, respectively, and these are referred to as a fifth marker set. Similarly, the first nozzle marker 282 (second A marker) and the first nozzle marker 287 (second B marker) are printed with the K ink of the second nozzle group 322. Then, the second nozzle markers 292, 297 with the composite black are printed with the C ink, the M ink, and the Y ink of the second nozzle group 322. The second nozzle markers 292, 297 are hereinafter referred to as a sixth A marker and a sixth B marker, respectively, and these are referred to as a sixth marker set.

The first nozzle marker 283 (third A marker) and the first nozzle marker 286 (third B marker) are printed with the K ink of the third nozzle group 323. Then, the second nozzle markers 293, 296 with the composite black is printed with the C ink, the M ink, and the Y ink of the third nozzle group 323. The second nozzle markers 293, 296 are hereinafter referred to as a seventh A marker and a seventh B marker, respectively, and these are referred to as a seventh marker set. The first nozzle marker 284 (fourth A marker) and the first nozzle marker 285 (fourth B marker) are printed with the K ink of the fourth nozzle group 324. Then, the second nozzle markers 294, 295 with the composite black are printed with the C ink, the M ink, and the Y ink of the fourth nozzle group 324. The second nozzle markers 294, 295 are hereinafter referred to as an eighth A marker and an eighth B marker, respectively, and these are referred to as an eighth marker set.

In the present embodiment, the print unit 11 prints the two nozzle markers belonging to the same marker set in the same pass. In addition, the print unit 11 prints all the marker sets in the same row, that is, at an equal position in the sub-scanning direction.

Further, the fifth A marker and the fifth B marker are printed at positions at a fixed distance to the left from the first A marker and the first B marker, respectively. Similarly, the sixth A marker and the sixth B marker are printed at positions at a fixed distance to the left from the second A marker and the second B marker, respectively. Further, the seventh A marker and the seventh B marker are printed at positions at a fixed distance to the left from the third A marker and the third B marker, respectively, and the eighth A marker and the eighth B marker are printed at positions at a fixed distance to the left from the fourth A marker and the fourth B marker, respectively.

FIGS. 11A-11B are diagrams illustrating the inter-marker distances. FIG. 11A shows the inter-marker distances of the first nozzle markers 281 to 288 printed with the K ink. FIG. 11B shows the inter-marker distances of the second nozzle markers printed with the chromatic color ink. In the present embodiment as well, it is assumed that the inter-marker distance of each of the first marker set to the fourth marker set is unique. Further, as shown in FIG. 11B, similarly, in the second nozzle markers 291 to 298 with the composite black, the inter-marker distance of each of the fifth marker set to the eighth marker set is assumed to be a unique length.

That is, the inter-marker distance between the two first nozzle markers in each of the first to fourth marker sets is different from the inter-marker distances between any other two first nozzle markers with the K ink. Further, the inter-marker distance between the two second nozzle markers in each of the fifth to eighth marker sets is different from the inter-marker distances between any other two second nozzle markers with the chromatic color ink. Accordingly, the detection unit 133 can determine which nozzle marker is detected based on the inter-marker distance. Note that in the markers different in shape, there may be the inter-marker distance the same as another inter-marker distance such as the inter-marker distance of the first marker set and the inter-marker distance of the fifth marker set.

Further, in the present embodiment, the detection unit 133 detects the first nozzle markers 281 to 288 with the K ink, obtains the inter-marker distance from the detection result, and then detects the nozzle inspection pattern 210 based on the unique length when the unique length is obtained. Further, when the nozzle inspection pattern 210 is successfully detected based on the first nozzle markers 281 to 288 with the K ink, the detection unit 133 does not perform the detection of the second nozzle markers 291 to 298 with the chromatic color ink and the matching processing. On the other hand, when the nozzle inspection pattern 210 is not successfully detected based on the first nozzle markers 281 to 288 with the K ink, the detection unit 133 performs the detection of the second nozzle markers 291 to 298 with the chromatic color ink to obtain the inter-marker distance from the detection result. Then, when the unique length was obtained, the detection unit 133 detects the nozzle inspection pattern 210 based on the unique length. This makes it possible to efficiently detect the nozzle inspection pattern 210.

Figure 12:
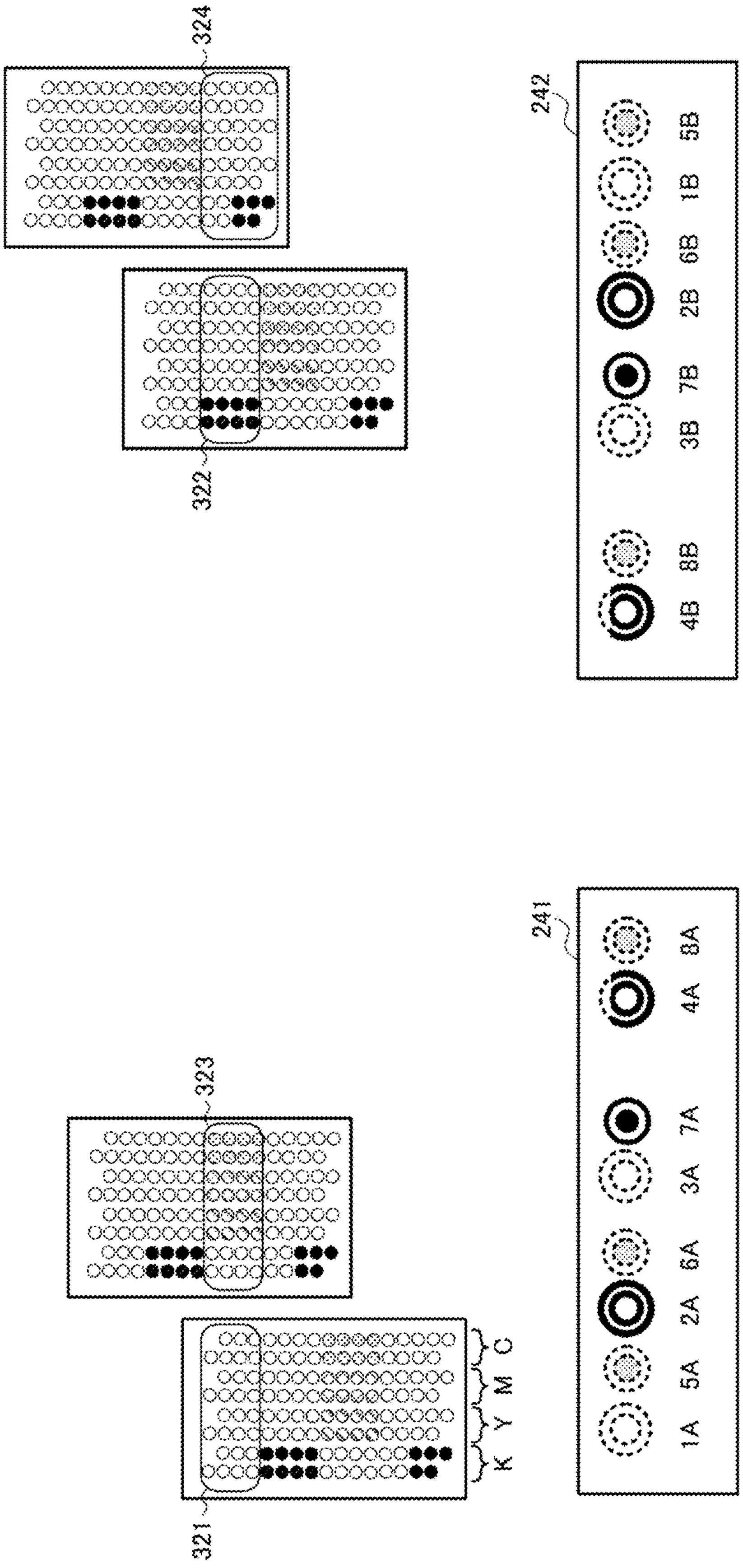
FIG. 12 is an illustration diagram of the marker set detection processing.

FIG. 12 and FIGS. 13A-13B are illustration diagrams of the marker set detection processing. For example, it is assumed that the second A marker, the second B marker, the fourth A marker, and the fourth B marker were detected as shown in FIG. 12. In this case, 39, 46, and 32 are obtained as the inter-marker distance. Among these, since the unique lengths are 46 and 32, it is determined that the second marker set and the fourth marker set corresponding to these were detected. Note that it is possible to determine which one of the two marker sets is the second marker set, and which one of the marker sets is the fourth marker set from the positional relationship between the two sets. Then, the nozzle inspection pattern 210 is detected using the second marker set the longest in inter-marker distance. Note that in the example shown in FIG. 12, the seventh A marker and the seventh B marker are also printed, but the detection of these markers is not performed since the second marker set and the fourth marker set are detected.

Note that other configurations and processing of the multifunction peripheral 10 according to the second embodiment are substantially the same as those of the multifunction peripheral 10 according to the first embodiment.

Figure 14:
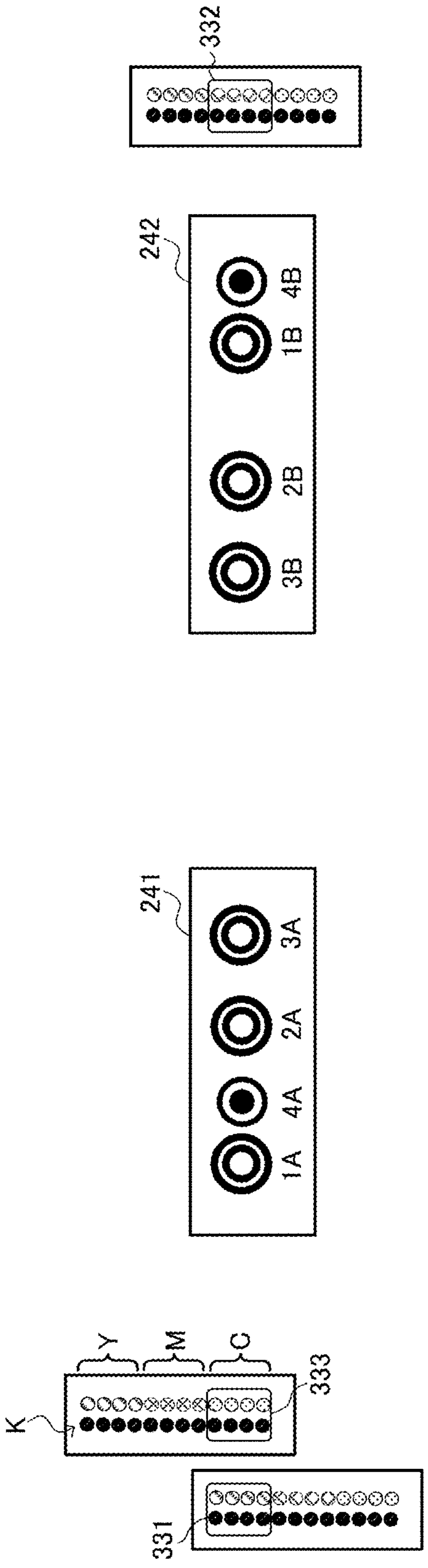
FIG. 14 is an illustration diagram of nozzle arrays and nozzle markers according to a modified example.

A modified example of the second embodiment will be described. As shown in FIG. 14, the print head 111 includes a single nozzle array of K ink and a single nozzle array of CMY chromatic color ink. When such a print head 111 is provided, the nozzle arrays are divided into a first nozzle group 331, a second nozzle group 332, and a third nozzle group 333. The first nozzle group 331 includes first to fourth nozzles of the K ink and four nozzles of the Y ink. The second nozzle group 332 includes fifth to eighth nozzles of the K ink and four nozzles of the M ink. The third nozzle group 333 includes ninth to twelfth nozzles of the K ink and four nozzles of the C ink.

Further, the first A marker and the first B marker are printed with the K ink of the first nozzle group 331. Subsequently, the second A marker and the second B marker are printed with the K ink of the second nozzle group 332, and the third A marker and the third B marker are printed with the K ink of the third nozzle group 333. Meanwhile, the fourth A marker and the fourth B marker are printed with the Y ink of the first nozzle group 331, the M ink of the second nozzle group 332, and the C ink of the third nozzle group 333.

The embodiment described above is an example for implementing the present disclosure, and a variety of other embodiments can be employed. For example, various modifications and changes can be made within the scope of the gist of the present disclosure set forth in the appended claims, such as applying a modified example of a certain embodiment to another embodiment.

Further, the present disclosure is also applicable to a program to be executed by a computer or a method. Further, the present disclosure may be implemented as such a standalone apparatus as described above in some cases, or may be implemented using components provided to a plurality of apparatuses in some cases, and should include a variety of aspects. Further, the present disclosure may be changed as appropriate to such a configuration as to be partially formed of software and partially formed of hardware. Moreover, the present disclosure may be realized as a recording medium storing a program that controls the system. Obviously, the recording medium storing the program may be a magnetic recording medium or may be a semiconductor memory, and any recording medium to be developed in the future can be similarly employed.

What is claimed is:

1. A method of manufacturing a printer including making an unadjusted printer of a serial inkjet type print an inspection sheet including an inspection pattern, making a scan unit read the inspection sheet, and adjusting the unadjusted printer based on the inspection pattern which is detected by performing analysis the inspection sheet thus read to thereby manufacture an adjusted printer, the method comprising:

making the unadjusted printer print at least two first markers using black ink; and making the unadjusted printer print at least two second markers using chromatic color ink, wherein the second marker has a shape in which the chromatic color ink is applied in a region in which the black ink is not applied in the first marker when a central position of the second marker is aligned with a central position of the first marker, and a position of the inspection pattern in the inspection sheet is identified based on a position of a marker determined by the analysis.

2. The method of manufacturing the printer according to claim 1, wherein in the analysis, a position of the inspection pattern in the inspection sheet is identified based on a distance between the two first markers detected in the inspection sheet or a distance between the two second markers detected in the inspection sheet.

3. The method of manufacturing the printer according to claim 1, wherein in the analysis of the inspection sheet, when the two first markers are detected, detection of the second marker is not performed.

4. The method of manufacturing the printer according to claim 1, wherein the second marker is printed with composite black.

5. The method of manufacturing the printer according to claim 1, wherein the first marker has a shape of a double wheel to which no ink is applied at a center, and the second marker has a shape formed of a circle to which the ink is applied at a center, and a ring disposed around the circle.

6. The method of manufacturing the printer according to claim 1, wherein the unadjusted printer is made to print the first marker and the second marker at equal positions in a sub-scanning direction.

7. The method of manufacturing the printer according to claim 1, wherein the inspection pattern includes a nozzle inspection pattern representing a condition of nozzle clogging, and the adjustment of the printer includes cleaning of the nozzle with an intensity corresponding to the condition of the nozzle clogging.

* * * * *